(12) United States Patent
Kinebuchi et al.

(10) Patent No.: US 6,512,881 B1
(45) Date of Patent: Jan. 28, 2003

(54) VIDEO SIGNAL REPRODUCTION APPARATUS AND METHOD

(75) Inventors: Naoyuki Kinebuchi, Saitama (JP); Toru Okazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/271,544

(22) Filed: Mar. 18, 1999

(30) Foreign Application Priority Data

Mar. 20, 1998 (JP) .......................................... 10-072684

(51) Int. Cl.$^7$ ................................................. H06N 5/91
(52) U.S. Cl. ........................................... 386/68; 386/67
(58) Field of Search ............................... 386/68, 67, 1, 386/6, 7, 69, 46, 5, 80, 81, 82, 129; H04N 5/91

(56) References Cited

U.S. PATENT DOCUMENTS 5,282,049 A  *  1/1994  Hatakenaka et al.
5,377,051 A  *  12/1994 Lane et al.

\* cited by examiner

*Primary Examiner*—Robert Chevalier
(74) *Attorney, Agent, or Firm*—Frommer Lawrence & Haug LLP; William S. Frommer (57) ABSTRACT

The present invention provides a controller operation in such way that in the forward slow reproduction or the forward stepped reproduction mode, when reproducing a video signal from a bit stream of coded video signal in which each frame consists of a first field and a second field, if a currently reproduced picture is the bottom field, a reproduction position pointer is shifted to the next frame to be reproduced.

5 Claims, 8 Drawing Sheets

VIDEO SIGNAL REPRODUCTION APPARATUS AND METHOD

BACKGROUND OF THE INVENTION

1. Field of the Invention

The present invention relates to a video signal reproduction apparatus and method for reproducing a video signal from a recording medium containing a video signal prediction-coded in the time axis direction and in particular, to a video signal reproduction apparatus and method preferably used for performing a forward direction slow reproduction and forward direction stepped reproduction of a video signal recorded on a recording medium.

2. Description of Prior Art

A so-called digital video disc (hereinafter, referred to as DVD) is known as a recording medium of an optical disc containing a digital video signal and a digital audio signal recorded.

Figure 3:
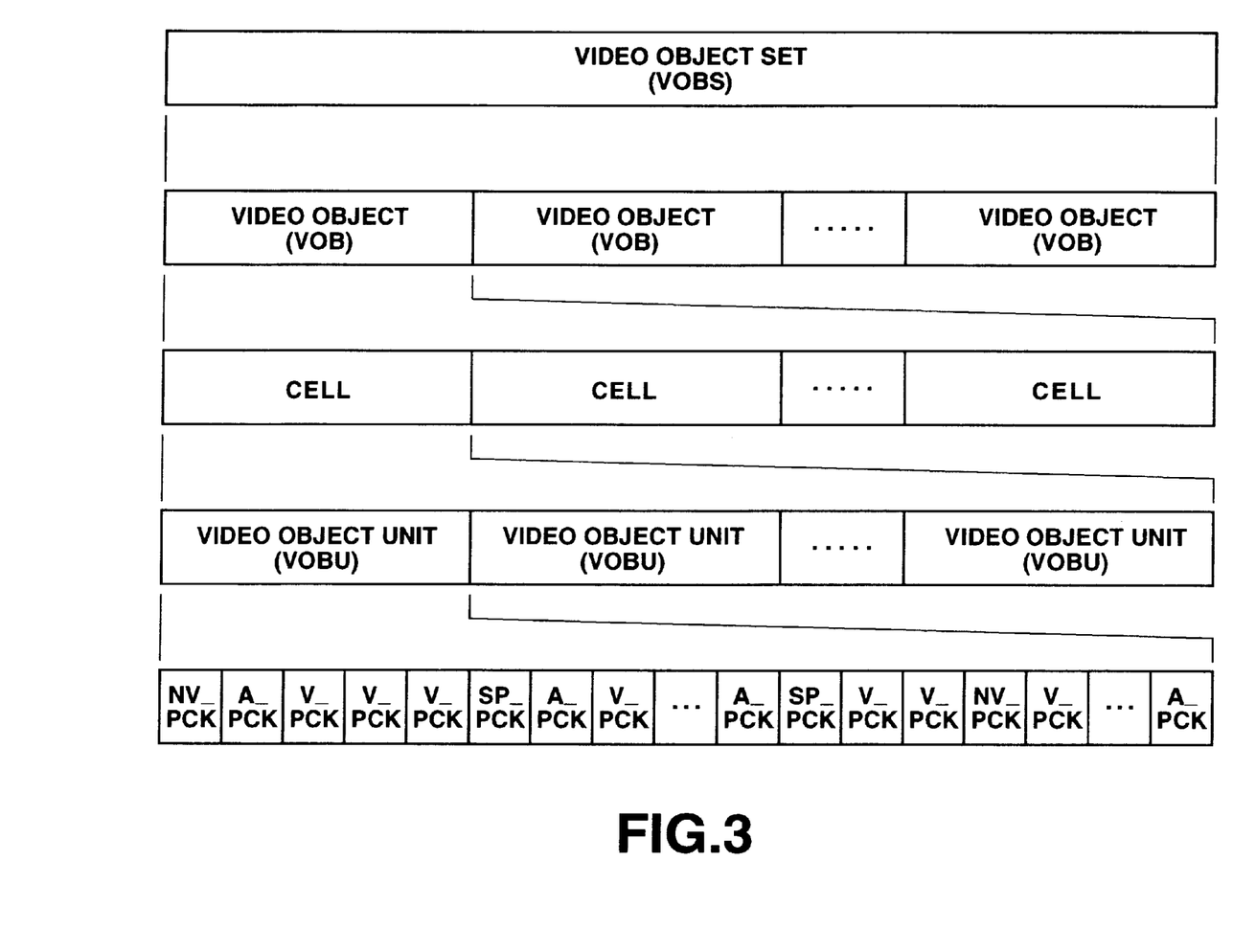
FIG. 3 shows a VOBS data format in the DVD-Video.

This DVD is formatted in cells as basic units for reproducing information contents. Each of the cells consists of a reproduction unit of 0.4 to 1.2 seconds called a video object unit (VOBU). At the head of VOBU, a navigation pack NV_PCK is allocated as a control information pack. This NV_PCK contains a presentation control information (PCI) and a data search information (DSI). These information items are used as a VOBU address information for scanning before and after a VOBU as the aforementioned reproduction minimum unit Here, FIG. 3 shows a data configuration of the aforementioned DVD format. as shown in this FIG. 3, a unit of a video object set (VOB) is used for management of a main video data, sub video data, and an audio data. This VOBS, for example, includes a whole one work. The VOBS consists of a plurality of video objects (VOB's). The VOB consists of a group of data items recorded on a disc. Each VOBS consists of a plurality of cells. Each cell represents a single scene or one cut in a movie. One cell lasts 10 seconds or so. Moreover, the DVD has a function of a multi-story format for showing one movie in a plurality of stories, or a function of a so-called parental lock for skipping an educationally unacceptable scene such as violence. These functions are created by combination of these cells.

One cell consists of a plurality of video object units (VOBU's). Each VOBU is a unit of 0.4 to 1.2 seconds of a moving picture. This VOBU contains, for example, one GOP (Group of Pictures) in a so-called MPEG format. It should be noted that the MPEG is a hybrid data compression standard suggested by ISO-IEC/JTC1/SC2/WG11 and uses a motion compensation predictive coding in combination with discrete cosine transform (DCT). The GOP (group of pictures) of MPEG standard contained in the VOBU consists of intra-frame predictive coding pictures (I picture), inter-frame forward predictive coding pictures (P pictures), and inter-frame bidirectional predictive coding pictures (B pictures). For example, if one GOP consists of 15 frames, the GOP contains one frame of I picture, four frames of P picture, and 10 frames of B picture.

Figure 6A:
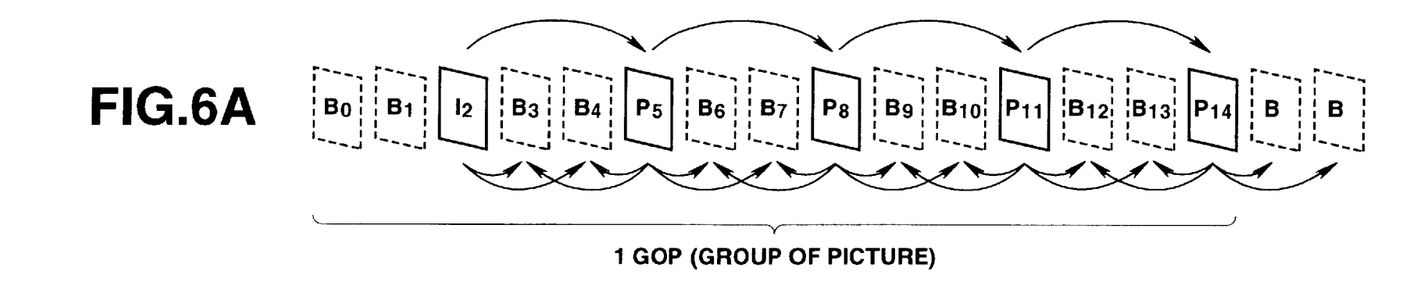
FIG. 6A and FIG. 6B shows a configuration of inter-frame prediction and a configuration of recording frames in the MPEG method.

FIG. 6A shows a configuration example of inter-frame prediction in the MPEG method when one GOP consists of 15 frames, for example.

In this FIG. 6A, the I picture is an intra-frame predictive coding picture which is predictive-coded within a frame; the P picture is an inter-frame forward predictive coding picture which performs prediction referencing a temporally preceding coded picture (I picture or P picture); and the B picture is a bidirectional predictive coding picture which performs prediction referencing two frames, i.e., temporally preceding and following pictures.

That is, as shown by arrows, I picture $I_2$ is intra-frame prediction coded within the frame; P picture $P_5$ is inter-frame prediction coded by referencing the I picture $I_2$; and a P picture $P_8$ is inter-frame prediction coded by referencing the P picture $P_5$. Furthermore, B pictures $B_3$ and $B_4$ are inter-frame prediction coded by referencing two pictures, I picture $I_2$ and P picture $P_5$; and B pictures $B_6$ and $B_7$ are inter-frame prediction coded by referencing two pictures, P picture $P_5$ and P picture $P_8$. In the same way, the other pictures are prediction coded. It should be noted that the subscription number of each picture represents a temporary reference (hereinafter, referred to as TR). This TR indicates the frame sequence within GOP. In a normal video reproduction, the frames are reproduced in this TR sequence.

When decoding the pictures thus coded, the decoding is performed as follows. In the case of I picture which has been prediction coded within a frame, the I picture alone can be decoded. However, in the P picture which has been prediction coded by referencing a temporally preceding I picture or P picture, a temporally preceding I picture or P picture is required for decoding. In the case of B picture which has been prediction coded by referencing two pictures temporally preceding and following, its decoding requires an I picture or P picture temporally preceding and following.

Figure 6B:
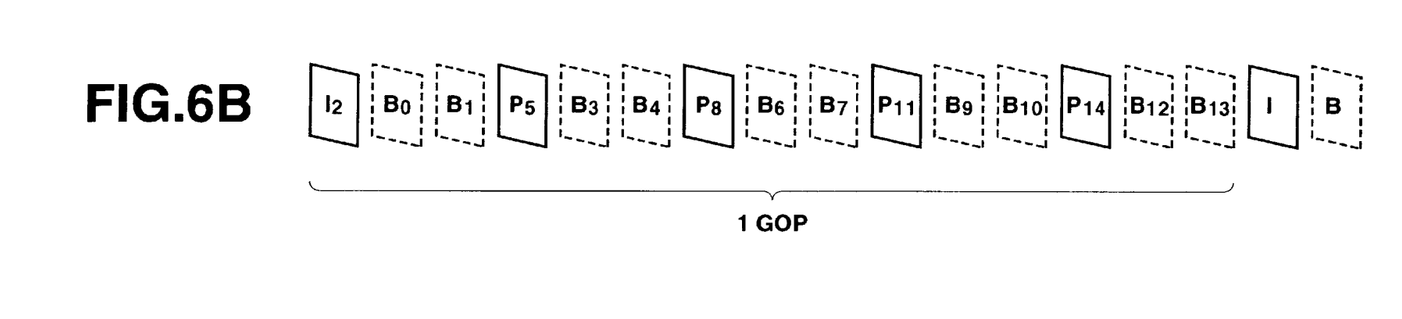

For this, pictures are arranged as shown in FIG. 6B so that pictures required for decoding are decoded beforehand. That is, decoding of B pictures $B_0$ and $B_1$ requires an I picture or P picture in a preceding GOP and the I picture $I_2$ in the current GOP. Accordingly, the I picture $I_2$ is arranged prior to the B pictures $B_0$ and $B_1$. Decoding of B pictures $B_3$ and $B_4$ requires the I picture $I_2$ and P picture $P_5$. Accordingly, the P picture $P_5$ is arranged prior to the B pictures $B_3$ and $B_4$. Decoding of B pictures $B_6$ and $B_7$ requires the P picture $P_5$ and the P picture $P_8$. Accordingly, the P picture $P_8$ is arrange prior to the B pictures $B_6$ and $B_7$. Decoding of B pictures $B_9$ and $B_{10}$ requires P pictures $P_8$ and $P_{11}$. Accordingly, the P picture $P_{11}$ is arranged prior to the B pictures $B_9$ and $B_{10}$. Decoding of B pictures $B_{12}$ and $B_{13}$ requires P pictures $P_{11}$ and $P_{14}$. Accordingly, the P picture $P_{14}$ is arranged prior to the B pictures $B_{12}$ and $B_{13}$. Thus, in the MPEG method, the decoding order is different from the presentation order of the frames.

Referring back to FIG. 3, each VOBU contains a navigation pack NV_PCK which is a control information having a VOBU management information, a video pack V_PCK which is a pack having a main video data, an audio pack A_PCK having an audio data, and a sub picture pack SP_PCK which is a pack having a sub video data. The V_PCK, A_PCK, and SP_PCK are compressed in the MPEG2 format or the like and recorded on an optical disc as a recording medium.

Figure 8:
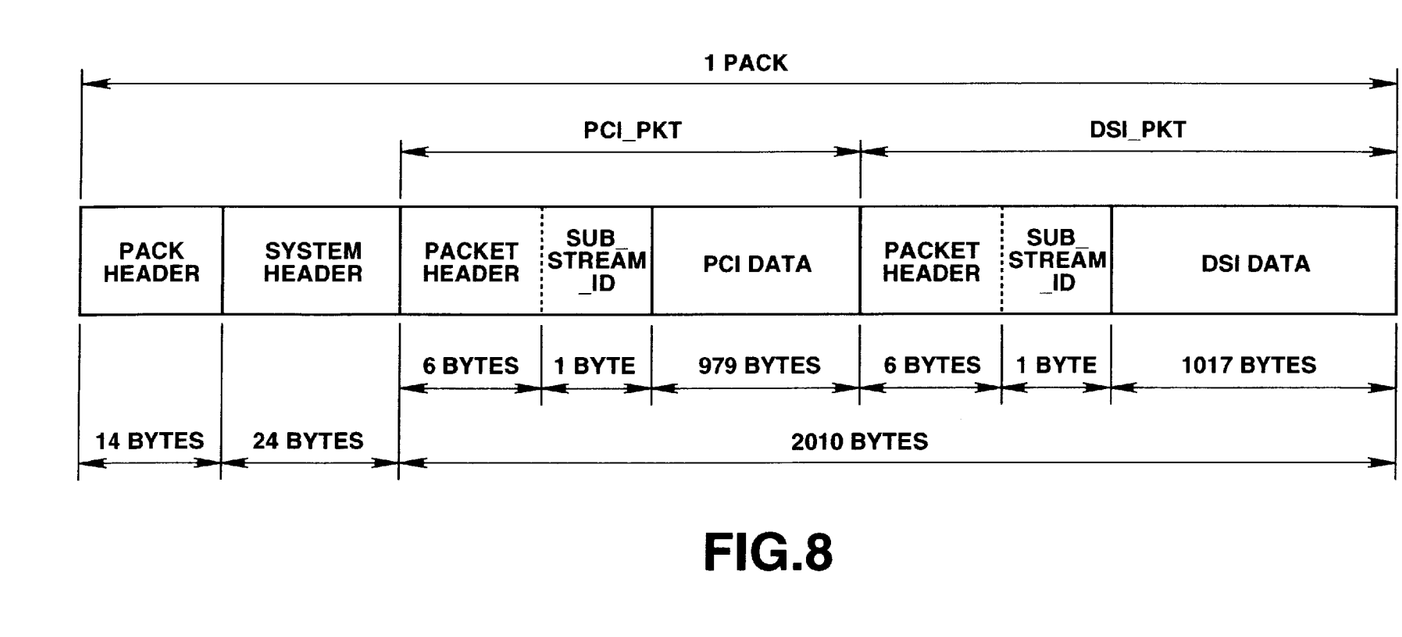
FIG. 8 shows a configuration of a navigation pack.

FIG. 8 shows a configuration of a navigation pack NV_PCK which is control information pack arrange at the head of a VOBU. As shown in FIG. 8, the NV_PCK contains a Pack header and a System header followed by a Presentation control information (PCI) and a Data search information (DSI). The PCI packet contains a PCI data, and the DSI packet contains a DSI data.

Furthermore, the DSCI data contains a DSI general information DSI_GI (not depicted). This DSI_GI contains end addresses of the reference pictures (I picture and P picture)

in the MPEG pictures, i.e., VOBU_1STREF_EA which is the end address of the first reference picture in the VOBU, VOBU_2NDREF_EA which is the end address of the second reference picture in the VOBU, and VOBU_3RSREF_EA which is the end address of the second reference picture in the VOBU.

Figure 9:
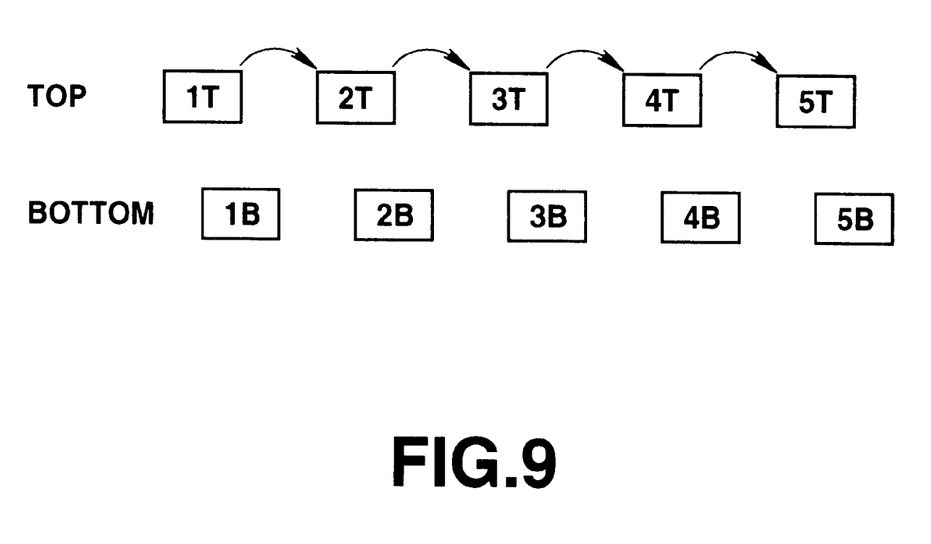
FIG. 9 explains a video reproduction in SlowF (forward slow reproduction) mode.

On the other hand, as shown in FIG. 9, a video signal consists of a top field and a bottom field that constitute a frame as a unit. In a normal Play mode, reproduction of the top field is performed before the bottom field.

This video signal using as a unit the pair of two pictures, i.e., top field and bottom field, is applied to, for example, to a skip scan, a so-called interlace method. It should be noted that there is also a progressive method which scans the scan lines one after another without skipping a scan line.

In a conventional video signal reproduction apparatus, the forward slow reproduction (SlowF) or forward stepped reproduction (StepF), as shown in FIG. 9, only the top fields are reproduced one after another. That is, a top field of one frame is followed by the top field of the next frame, skipping the bottom field of the current frame.

Accordingly, in the conventional forward slow reproduction (SlowF) or the forward stepped reproduction (StepF), only half of the fields are reproduced, slightly lacking in a smoothness of the representation.

Furthermore, in the conventional forward slow reproduction (SlowF) or the forward stepped reproduction (StepF), there are fields not displayed and accordingly, an unnatural feeling may be caused in correspondence between the video and the audio.

SUMMARY OF THE INVENTION

It is therefore an object of the present invention to provide a video signal reproduction apparatus and method capable of a video signal reproduction giving a smooth motion representation while maintaining a proper correspondence between the audio and the video even in the forward slow reproduction (SlowF) or in the forward stepped reproduction (StepF).

In order to achieve the aforementioned object, the video signal reproduction apparatus according to the present invention is for reproducing a video signal from a bit stream of coded video signal in which each frame consists of a first field and a second field, the apparatus comprising a controller operating in such a way that in a forward slow reproduction mode for reproducing a video signal from the bit stream in a forward direction at a lower speed than a standard reproduction speed, or in a forward stepped reproduction mode for reproducing a video signal from the bit stream in a forward direction picture by picture, if a currently reproduced field is the second field, a reproduction position pointer is shifted to the next frame to be reproduced.

The video signal reproduction method according to the present invention is for reproducing a video signal from a bit stream of coded video signal in which each frame consists of a first field and a second field, wherein in a forward slow reproduction mode for reproducing a video signal from the bit stream in a forward direction at a lower speed than a standard reproduction speed, or in a forward stepped reproduction mode for reproducing a video signal from the bit stream in a forward direction picture by picture, if a currently reproduced field is the second field, a reproduction position pointer is shifted to the next frame to be reproduced.

DETAILED DESCRIPTION OF PREFERRED EMBODIMENTS

Hereinafter, description will be directed to a video signal reproduction apparatus and method according to an embodiment of the present invention with reference to the attached drawings.

Firstly, explanation will be given on the embodiment of the present invention applied to a video signal reproduction apparatus for reproducing a video signal by decoding a coded data recorded on a DVD-Video which is a DVD used for recording a video signal and the like.

Figure 1:
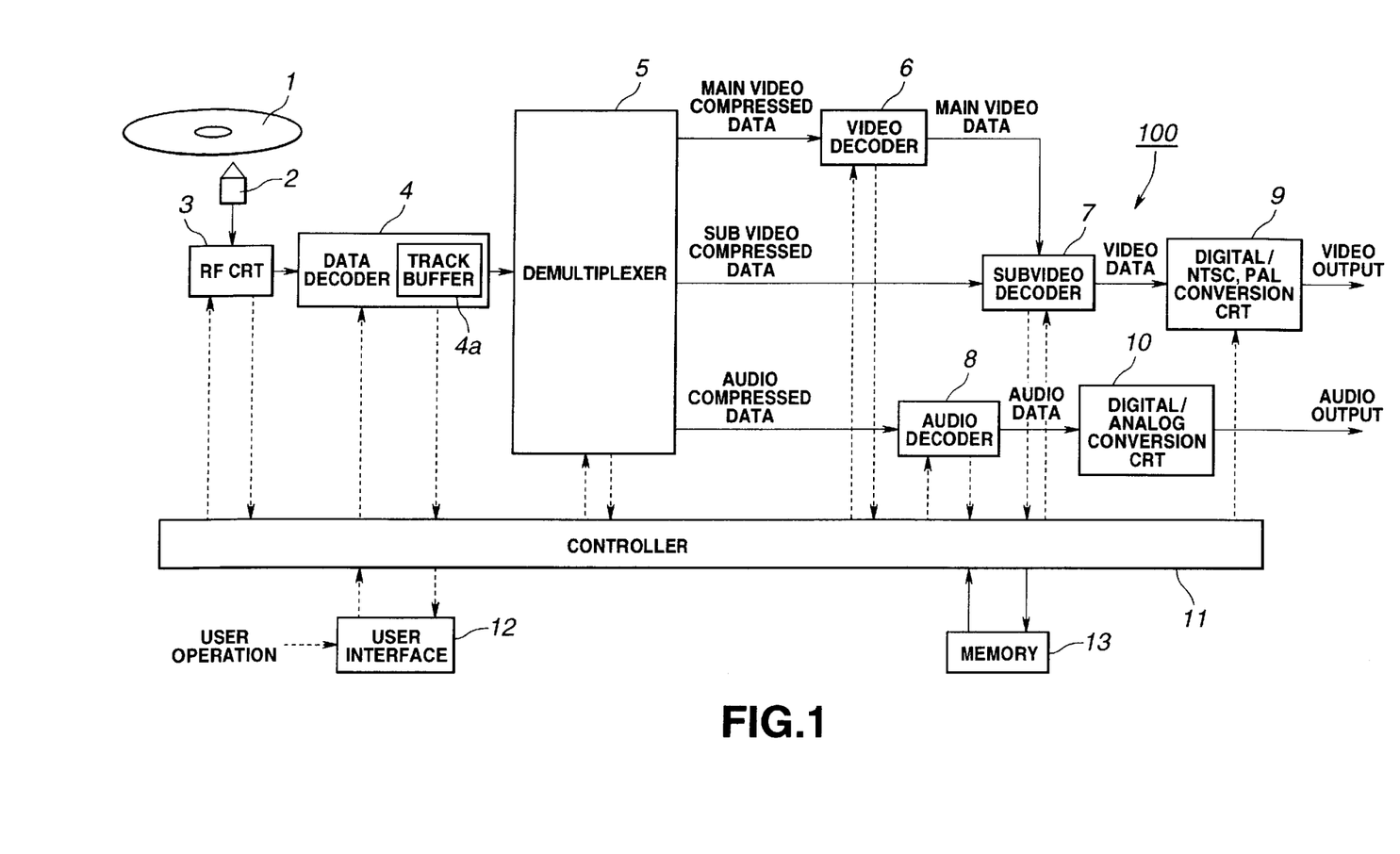
FIG. 1 is a block diagram showing a configuration example of the video signal reproduction apparatus according to the present invention.

Referring to a block diagram of FIG. 1, configuration of the video signal reproduction apparatus 100 will be explained. It should be noted that in the DVD-Video, a video data is compression-coded by the MPEG method so as to be recorded on a disc. Accordingly, this video signal reproduction apparatus 100 reads out from a disc a video data which has been compression-coded by the MPEG method, and decodes the video data for reproduction.

The video signal reproduction apparatus 100 includes: a pickup 2 for reproducing an RF signal from a recording medium 1; an RF circuit 3 that is supplied with the RF signal from the pickup 2 and performs a digitization processing of the RF signal; a data decoder 4 that is supplied with a reproduction data from the RF circuit 3 and performs a decoding including an error correction to the reproduction data; and a demultiplexer for isolating a main video compressed data, a sub video compressed data, and an audio compressed data from the reproduction data which has been decoded by the data decoder 4.

Moreover, the video signal reproduction apparatus 100 includes: a video decoder 6 for decompressing the aforementioned video compressed data; a sub video decoder 7 for decompressing the aforementioned sub video compressed data and combine it with the main video data; an audio decoder 8 for decompressing the aforementioned audio compressed data; a digital/NTSC-PAL conversion circuit 9 (hereinafter, referred to simply as an NTSC conversion circuit) that is supplied with the combined data of the main video data from the video decoder 6 and the sub video data from the sub video decoder 7, and converts the combined video signal into an NTSC signal or PAL signal the video data; and a digital/analog conversion circuit 10 (hereinafter, referred to as a D/A conversion circuit) that is supplied with an audio data from the audio decoder 8 and converts the audio data into an analog signal. Moreover, the video signal reproduction apparatus 100 includes: a controller 11 for controlling the pickup 2, the RF circuit 3, the data decoder 4, the demultiplexer 5, the video decoder 6, the sub video decoder 7, the audio decoder 8, the NTSC conversion circuit 9, and the D/A conversion circuit 10; a user interface 12 for interfacing between the controller 11 and a user operation; and a memory 13 serving as a data storage for the controller 11.

The recording medium 1 is a DVD-Video containing a video data and the like which has been compression-coded by the MPEG method. The video data and the like recorded on this recording medium 1 is reproduced by the video signal reproduction apparatus 100. It should be noted that the recording medium 1 may be a reproduction-dedicated type, writable type, or re-writable type.

The pickup 2 reproduces an RF signal from the recording medium 1 and supplies the RF signal to the RF circuit 3.

The RF circuit 3 performs waveform equalization and digitization to the RF signal supplied form the pickup 2, and creates a digital data and synchronization signal. The digital data and others created by the RF circuit 3 are supplied to the data decoder 4.

The data decoder 4, according to the digital data created by the RF circuit 3, performs demodulation of the data and error correction. The digital data which has been subjected to the demodulation and error correction by the data decoder 4 is supplied to the demultiplexer 5.

Moreover, the data decoder detects a parameter information contained in the system header and pack header of the MPEG format as well as a predetermined information contained in the navigation pack NV_PCK. The parameter information and other information detected are supplied from the data decoder 4 to the controller 11.

Moreover, the data decoder 4 has a track buffer 4a at a digital data output stage. This track buffer 4a absorbs a difference in processing speed between the data decoder 4 and the demultiplexer 5.

The demultiplexer divides the digital data which has been subjected to demodulation and error correction by the data decoder, into a main compressed data, a sub compressed data, and an audio compressed data.

Here, the main video compressed data is a video data which has been compressed by the MPEG method and corresponds to a video stream in the DVD format. The sub video compressed data is a data such as a superimpose image to be combined with the main video and corresponds to a sub-picture stream in the DVD format. The audio compressed data is an audio data compressed by the MPEG method and corresponds to an audio stream in the DVD format.

The demultiplexer 5 supplies the main video compressed data to the video decoder 6, the sub video compressed data to the sub video decoder 7, and the audio compressed data to the audio decoder 8.

The video decoder 6 demodulates the main video compressed data so as to create a decompressed main video data. This video decoder 6 has a frame memory for four frames for performing a demodulation. That is, the video decoder 6 demodulate a main video compressed data and obtains a picture data successively stores in the frame memory up to four frames while updating a picture data which has become unnecessary. The video decoder successively reads out demodulated pictures from the frame memory ad supplies the picture data to the sub video decoder 7.

It should be noted that the frame memory of the video decoder 6 is not limited for four frames but may have a larger capacity.

The sub video decoder 7 demodulates the sub video compressed data to obtain a decompressed sub video data, which is combined with the main video data supplied from the video decoder 6, thus creating a combined video data of the main video and the sub video. That is, in the sub video decoder 7, the sub video such as a superimpose image is combined with the main video. It should be noted that in case no sub video data is present, the sub video decoder 7 outputs the main video data as the video data. The video data created by the sub video decoder 7 is supplied to the NTSC conversion circuit 9.

The audio decoder 8 decodes the audio compressed data so as to create a decompressed audio data. That is, if the audio compressed data is a data compressed by the MPEG method, the audio decoder 8 performs a decompression corresponding to the MPEG method and creates an audio data. It should be noted that if the audio compressed data is formatted by other then MEPG, such as PCM, a processing corresponding to the format is performed. The audio data created by the audio decoder 8 is supplied to the D/A conversion circuit 10.

The NTSC conversion circuit 9 converts the video data from a digital data into a television signal such as NTSC or PAL for output. This output is supplied to a display apparatus such as CRT display, so that a user can view the video reproduced from the recording medium 1.

The D/A conversion circuit 10 converts an audio data which is a digital data into an analog audio data for output. This output is supplied to a loud speaker or the like so that the user can hear the sound reproduced from the recording medium 1.

The controller 11 controls the pickup 2, the RF circuit 3, the data decoder 4, the demultiplexer 5, the video decoder, 6 the sub video decoder 7, the audio decoder 8, the NTSC conversion circuit 9, and the D/A conversion circuit 10. Moreover, the controller 11 is supplied with an operation input such as a reproduction mode switching via the user interface 12 consisting of an operation panel and a remote controller. The controller 11 controls respective circuit according to the operation input. It should be noted that the controller 11 makes the memory 13 to store a data required for control and performs control of the circuits, referencing the data stored in the memory 13.

It should be noted that in the forward slow reproduction or forward stepped reproduction, following means are realized, for example, as functions provided in the controller 11. They are; means for controlling to shift a target pointer which is a reproduction position pointer, to a next frame to be produced in the case when a bottom field which is a second field is detected; decision means for deciding whether the picture displayed is a top field as the first field or the bottom field as the second field; pointer shift means for shifting the target pointer to the next frame in a presentation order; and decode control means for performing decode control of the next frame on the bit stream.

That is, the controller 11 contains as function blocks at least decision mean for deciding whether the picture displayed is a top field or bottom field; pointer shift means for shifting he target pointer to the next frame in the presentation order; and decode control means for decode-controlling the next frame on the bit stream.

Next, explanation will be given on the coded data format to be recorded on the DVD-Video with reference to FIG. 2 and FIG. 3.

In the DVD-Video, a coded data contains a main video data, a sub video data, and an audio data. It should be noted that no all of these data are indispensable but can be selected according to an information to be recorded. Moreover, in the explanation below, the area where these data are recorded will be referred to as a video zone.

Figure 2:
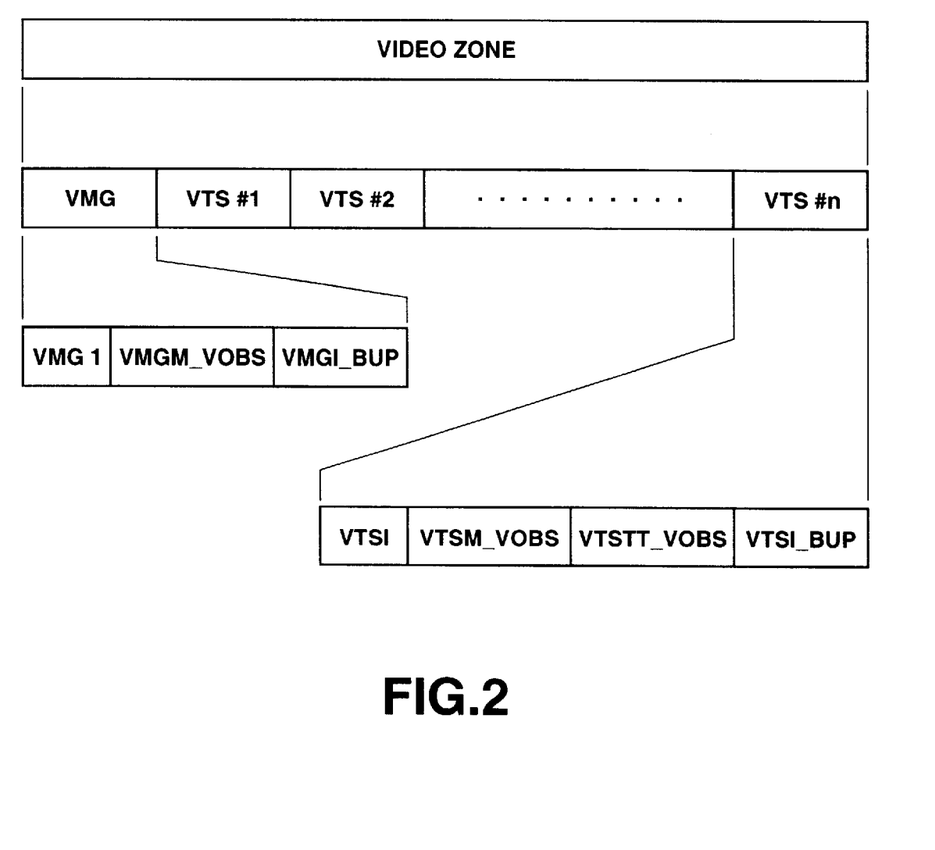
FIG. 2 shows a data format of a video zone in the DVD-Video.

As shown in FIG. 2, a video zone has a video manager (VMG) at the head of the video zone followed by a video title set (VTS). The VMG is an area containing an information on the VTS contained in the video zone. Each video zone has one VMG. On the other hand, the VTS is an area containing a title, i.e., an area where a title is actually recorded. Each video zone has at least one VTS. Up to 99 VTS can be contained. It should be noted that in a DVD-Video, a title is the largest unit of a video recorded. For example, in a DVD-Video containing a movie recorded, normally, one title corresponds to one movie.

The VMG consists of VMGI (VMG information) containing a basic information required for reproduction; VMGM_VOBS (Video object set foe VMG menu) containing a menu screen information for accessing a data recorded; and $VMGI_{13}$ BUP (backup of the VMGI) serving a VMGI backup. It should be noted that VMGM_VOBS is not indispensable and may be absent.

The VTS consists of VTSI (VTS information) containing PGCI (program chain information) indicting a cell sequence and correlation; VTSM_VOBS (Video object set for the VTS menu) containing a menu screen information for accessing a title recorded; VTSTT_VOBS (Video object set for titles in a VTS) containing an actual title; and VTSI_BUP (Backup of the VTSI) serving as a VTSI backup. It should be noted that the VTSM_VOBS is not indispensable and may be omitted.

Next, explanation will be given on the VOBS where a video data is actually arranged. Here, VMGM_VOBS, VTSM_VOBS, and VTSTT_VOBS are called as VOBS in general.

As shown in FIG. 3, the VOBS consists of more than one VOB (video object). Each VOB consists of more than one Cells. Here, a VOB number VOB_ID is assigned for each of the VOB's, and a Cell number Cell_ID is assigned for each of the Cells. Accordingly, a Cell in a VOBS is identified by the VOB_ID number and the Cell_ID number. The cells are interrelated by the PGCI recorded in the VTSI.

It should be noted that there is a case that only some of the cells related by the PGCI are to be recorded. For example, in a so-called program reproduction for reproducing a part of video recorded by programming beforehand, only some of the cells related by the PGCI are reproduced. In this case, only a part of cells related by the PGCI is to be reproduced. On the other hand, for example, when reproducing a video recorded from the head to the end, all the cells related by the PGCI are to be reproduced for reproducing all the cells related by the PGCI.

Each cell consists of one or more than one VOBU (Video object unit). That is, in the DVD-Video, a video data is divided beforehand into a predetermined data unit containing one or more GOP's. This unit is called VOBU. It should be noted that a data supply from the demultiplexer 5 to the video decoder 6 is performed in this VOBU unit.

A VOBU contains one or more GOP's (group of pictures). More specifically, as shown in FIG. 3, a VOBU contains a navigation pack NV_PCK containing an information on relationship between VOBU's, a main video data pack V_PCK containing a pack header and a main video data packet, an audio pack A_PCK containing a pack header and an audio data packet, and a sub video data pack SP_PCK (sub-picture pack) containing a pack header and a sub video data packet. Here, the main video data pack V_PCK is compression-coded by ISO/IEC13818-2 of the MPEG2 method or ISO/IEC11172-2 of the MPEG1 method.

The navigation pack NV_PCK is always positioned at the head of a VOBU. On the other hand, the main video data pack V_PCK, the audio data pack A_, and the sub video data pack SP-PCK may not be contained in the VOBU.

Next, explanation will be given on the operations in the video standard reproduction (Play), forward slow reproduction (SlowF), and forward stepped reproduction (StepF) modes.

Figure 4A:
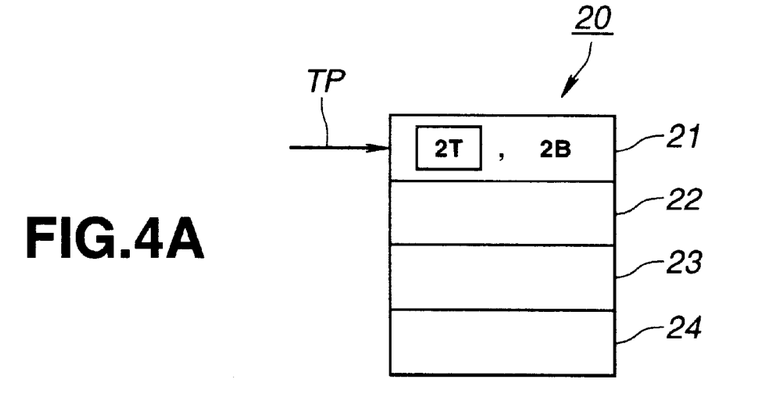
FIG. 4A and FIG. 4B shows a relationship between a video buffer and a target pointer FIG. 5 explains a video reproduction in SlowF (forward slow reproduction) mode.

As has been described above, the video decoder 6 has a frame memory for at least four frames for performing a decoding processing. That is, the video decoder 6 successively stores up to four frames while successively updating a picture data obtained by decoding the main video compressed data but already unnecessary. As shown in FIG. 4A, the frame memory 20 includes memories 21 ro 24, each of which contains one frame.

In the normal speed reproduction (Play), a frame which has been decoded is outputted in the sequence of the top field as the first field and the bottom field as the second field. In the frame memory 20, the frame reproduction position is identified by the target pointer serving as the reproduction position pointer.

In FIG. 4A, the target pointer TP indicates the first memory 21 of the frame memory 20 containing the top field "2T" and the bottom field "2B" of the second frame. Here, the field number indicates the frame order and the symbol T and B respectively represent a top field and a bottom field.

In the frame memory 20, from te memory 21 identified by the target pointer TP, the top field 2T and the bottom field 2B are successively decoded. When the display of the bottom field 2B is complete, the display of that frame is complete, and the garget pointer TP advances to the next frame, so as to reproduce the top field and the bottom field of the frame indicated by the target pointer. Thus, each of the frames is reproduced.

Figure 5:
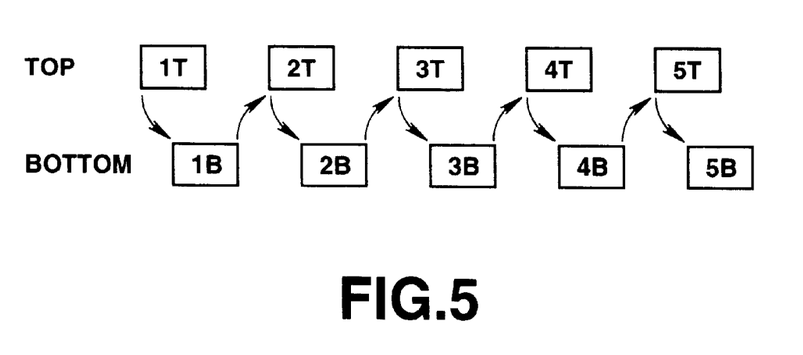

As shown in FIG. 5, in the forward slow reproduction (SlowF) also, similarly in the aforementioned reproduction (Play), frames are reproduced in the order of the top field and the bottom field. That is, in FIG. 5, the top field of the first frame IT is reproduced, and then the bottom field 1B of the first field is reproduced, after which the top field 2T and the bottom field 2B of the second frame are successively reproduced. Thus, the following frames are successively reproduced in the order of the top field and the bottom field.

Figure 4B:
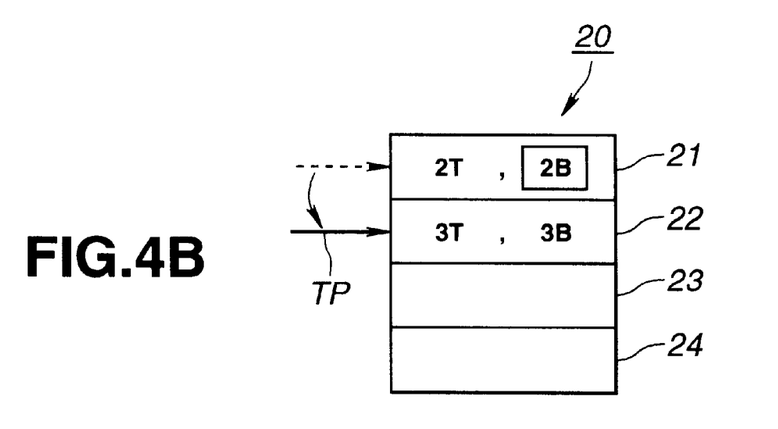

In the forward slow reproduction (SlowF) also, as shown in FIG. 4A, the top field 2T stored in the memory 21 indicated by the target pointer TP is reproduced. Next, as shown in FIG. 4B, when the bottom field 2B of the second frame in the memory 21 is reproduced, the target pointer proceeds to the memory 22 containing the third frame.

That is, the target pointer TP indicating a reproductions start position of the standard reproduction proceeds to the next frame to be reproduced when the bottom field as the second field is reproduced after the top field as the first field is reproduced. Here, the next frame is decoded on the bit stream.

In the forward slow reproduction (SlowF) mode, if the field is identified as a bottom field, the target pointer is controlled to shift to the next frame. This enables to eliminate a trouble caused when the target pointer is shifted in the same way as in the standard reproduction (Play).

That is, if the target pointer TP is controlled to proceed to the next frame after reproducing a bottom field in the same way as in the standard reproduction (Play), there is a trouble that the top field is instantaneously viewed. This trouble is eliminated.

That is, in this video signal reproduction apparatus, it is possible to switch from a top field to a bottom field during a decoding. This enables to show the video at twice higher speed in appearance and in a smooth motion.

On the other hand, in the forward stepped reproduction (StepF) mode, an external trigger such as depression of a frame feed button causes to feed each of the respective fields of frames.

In this forward stepped reproduction (StepF) mode, unlike in the forward slow reproduction (SlowF) in which each field is fed at a predetermined time interval, the fields are fed by an external trigger. The other operations are the same as in the aforementioned forward slow reproduction (SlowF).

That is, referring to FIG. 4A, according to an external trigger such as depression of a frame feed button, the top field 2T and the bottom field 2B of the second frame identified by the target pointer TP are reproduced in this order. As shown in FIG. 4B, when the bottom field 2B is reproduced, the target pointer proceeds to the third frame. In this order, as shown in FIG. 5, the respective fields of each frame are fed.

That is, in this video signal reproduction apparatus, switching from the top field to the bottom field is performed during a decoding in the forward stepped reproduction (StepF). In each frame, both of the top fields and bottom fields are reproduced, making the motion smooth.

It should be noted that the aforementioned forward slow reproduction (SlowF) or the forward stepped reproduction (StepF) may be switched to the standard reproduction (Play). This switching is performed by switching the forward slow reproduction (SlowF) or the forward stepped reproduction (StepF) to the standard reproduction (Play). In this case, display is started at the target pointer.

Moreover, in the aforementioned forward slow reproduction (SlowF) and the forward stepped reproduction (StepF), the target pointer is moved according to the frame representation order. On the other hand, decoding on frame basis from a bit stream is performed according to the recording frame order.

More specifically, for example, in the sequence of recording frames shown in FIG. 6B, when the bottom field of frame $B_4$ is reproduced, the target pointer is shifted to the next frame $P_5$ according to the representation order. On the other hand, while the bottom field of the frame $B_4$ is reproduced, the frame $P_8$ is decoded according to the bit field order shown in FIG. 6B.

Figure 7:
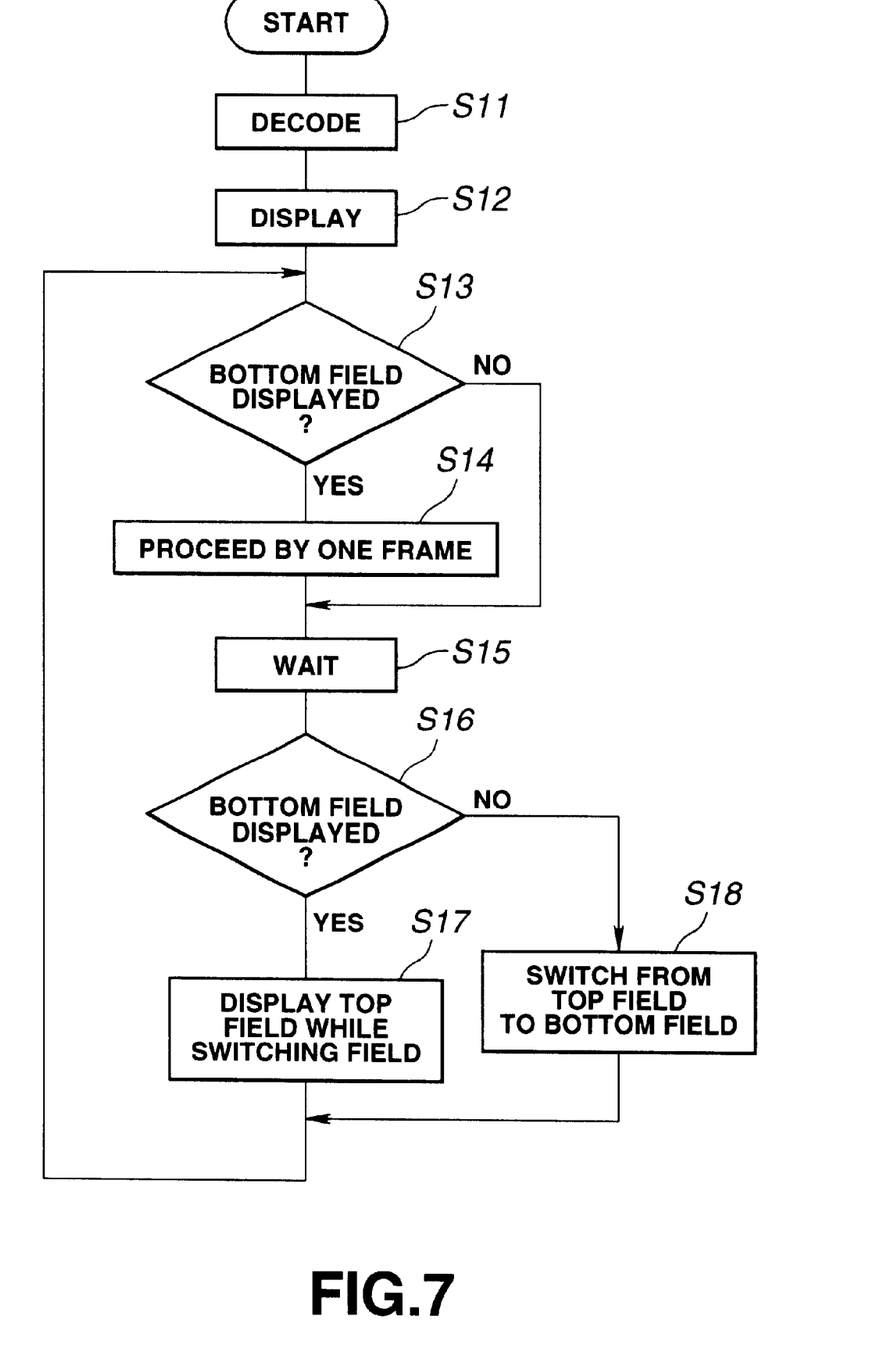
FIG. 7 is a flowchart showing a procedure of a video signal reproduction apparatus according to the present invention.

Description will now be directed to the video signal reproduction method as an embodiment of the present invention with reference to a flowchart of FIG. 7. The video reproduction method is for performing the forward slow reproduction (SlowF) or forward stepped reproduction (StepF).

Firstly, step S11 identifies a frame indicated by the target pointer serving as the reproduction position pointer. Next, step S12 displays one field from the frame identified in step S11. Control is passed to step S13.

In step S13, it is decided whether a bottom field is displayed. If YES, control is passed to step S14. If NO, control is passed to step S15.

In step S14, the target pointer is made to proceed to the next frame. That is, when the bottom field of the frame is reproduced, the target pointer indicating the reproduction start position in the standard reproduction mode is made advance to the next frame to be reproduced. It should be noted that as has been described above, the target pointer advances to the next frame for decoding according to the frame order in the bit stream.

In step S15, the system waits for a trigger for proceeding to the next field to be displayed. When the trigger is given, control is passed to step S16.

In step S16, it is decided whether the bottom field is displayed. If YES, control is passed to step S17. If NO, control is passed to step S18.

In step S17, the screen is switched while the top field is displayed. In step S18, switching from the top field to the bottom field is performed. Upon completion of step S17 or S18, control is returned to step S13.

Thus, when the bottom field of a frame is reproduced, the target pointer is made to advance to the next frame to be reproduced, enabling to eliminate the trouble caused conventionally.

That is, in the same way as in the standard reproduction (Play) mode, if the target pointer is moved to the next frame after completion of one frame reproduction, there arises a trouble that the top field is instantaneously viewed. This trouble is eliminated.

As has thus far been described, according to the present invention, in the forward slow reproduction (SlowF) or forward stepped reproduction (StepF), it is possible to display a smooth motion by consuming one more frame data if a bottom field is displayed.

It should be noted that the present invention is not to be limited tot he aforementioned embodiment. For example, the present invention can be applied not only to the interlace method which performs a picture skip scan but also to the progressive method which performs successive picture scan.

As has thus far been described, according to the present invention, the forward slow reproduction (SlowF) and the forward stepped reproduction (StepF) are performed by feeding the top field and the bottom field of each frame. Because both (all) of the fields of each frame are displayed, it is possible to obtain a smooth motion. Moreover, according to the present invention, the video can be related to the audio, reducing the unnatural correspondence between the video and audio conventionally felt in the slow reproduction or the stepped reproduction.

What is claimed is:

1. A video signal reproduction apparatus for reproducing a video signal from a bit stream of coded video signal in which each frame consists of a first field and a second field, said apparatus comprising a controller operating in such a way that in a forward slow reproduction mode for reproducing a video signal from said bit stream in a forward direction at a lower speed than a standard reproduction speed, or in a forward stepped reproduction mode for reproducing a video signal from said bit stream in a forward direction picture by picture, if a currently reproduced field is said second field, a reproduction position pointer is shifted to the next frame to be reproduced.

2. A video signal reproduction apparatus as claimed in claim 1, wherein said reproduction position pointer indicates a position at which switching to said standard reproduction speed is performed.

3. A video signal reproduction apparatus as claimed in claim 1, wherein said controller at least includes: decision means for deciding whether a currently reproduced picture is said first field or said second field; pointer shift means for shifting said reproduction position pointer to the next frame in the representation order; and decode control means for controlling decoding of the next frame on said bit stream.

4. A video signal reproduction method for reproducing a video signal from a bit stream of coded video signal in which each frame consists of a first field and a second field, wherein in a forward slow reproduction mode for reproducing a video signal from said bit stream in a forward direction at a lower speed than a standard reproduction speed, or in a forward stepped reproduction mode for reproducing a video signal from said bit stream in a forward direction picture by picture, if a currently reproduced field is said second field, a reproduction position pointer is shifted to the next frame to be reproduced.

5. A video signal reproduction method as claimed in claim 4, wherein said reproduction position pointer indicates a position at which switching to said standard reproduction speed is performed.

* * * * *